US009317482B2

(12) United States Patent
Davis et al.

(10) Patent No.: US 9,317,482 B2
(45) Date of Patent: Apr. 19, 2016

(54) UNIVERSAL FPGA/ASIC MATRIX-VECTOR MULTIPLICATION ARCHITECTURE

(71) Applicant: Microsoft Corporation, Redmond, WA (US)

(72) Inventors: John D. Davis, San Francisco, CA (US); Eric Chung, Sunnyvale, CA (US); Srinidhi Kestur, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 13/651,464

(22) Filed: Oct. 14, 2012

(65) Prior Publication Data

US 2014/0108481 A1 Apr. 17, 2014

(51) Int. Cl.
*G06F 17/16* (2006.01)

(52) U.S. Cl.
CPC ...................................... *G06F 17/16* (2013.01)

(58) Field of Classification Search
None
See application file for complete search history.

(56) References Cited

U.S. PATENT DOCUMENTS

| 5,206,822 | A | 4/1993 | Taylor |
| 8,175,853 | B2 | 5/2012 | Magerlein |
| 2007/0198621 | A1 | 8/2007 | Lumsdaine et al. |
| 2008/0082790 | A1 | 4/2008 | Diyankov et al. |
| 2012/0126850 | A1* | 5/2012 | Wasson et al. ................. 326/38 |
| 2012/0278376 | A1* | 11/2012 | Bakos ........................ 708/607 |

OTHER PUBLICATIONS

Shan et al; "FPGA and GPU Implementation of Large Scale SpMV;" pp. 64-70; Jun. 13-14, 2010 IEEE.*
"Intel Math Kernel Library", Retrieved at <<http://software.intel.com/en-us/intel-mkl>>, Jul. 5, 2012, pp. 2.
"Nvidia CUBLAS", Retrieved at <<http://developer.nvidia.com/cublas>>, Jul. 5, 2012, pp. 4.
"Nvidia cuSPARSE", Retrieved at <<http://developer.nvidia.com/cusparse>>, Jul. 5, 2012, pp. 5.
Davis, Timothy A., "The University of Florida Sparse Matrix Collection", Retrieved at <<http://citeseerx.ist.psu.edu/viewdoc/download?doi=10.1.1.94.1925&rep=rep1&type=pdf>>, in Journal of NA Digest, vol. 92, Oct. 16, 1994, pp. 15.
Davis, et al., "Bees: Revitalizing Computer Architecture Research", Retrieved at <<http://caxapa.ru/thumbs/282284/BEE3_TechReport.pdf>>, in Microsoft Research, Tech. Rep. MSR-TR-2009-45, Apr. 2009, pp. 13.

(Continued)

*Primary Examiner* — Michael D Yaary
(74) *Attorney, Agent, or Firm* — Sandy Swain; Micky Minhas

(57) ABSTRACT

A universal single-bitstream FPGA library or ASIC implementation accelerates matrix-vector multiplication processing multiple matrix encodings including dense and multiple sparse formats. A hardware-optimized sparse matrix representation referred to herein as the Compressed Variable-Length Bit Vector (CVBV) format is used to take advantage of the capabilities of FPGAs and reduce storage and bandwidth requirements across the matrices compared to that typically achieved when using the Compressed Sparse Row (CSR) format in typical CPU- and GPU-based approaches. Also disclosed is a class of sparse matrix formats that are better suited for FPGA implementations than existing formats reducing storage and bandwidth requirements. A partitioned CVBV format is described to enable parallel decoding.

11 Claims, 5 Drawing Sheets

(56) References Cited

OTHER PUBLICATIONS

Vuduc, et al., "Performance Optimizations and Bounds for Sparse Matrix-Vector Multiply", Retrieved at <<http://ieeexplore.ieee.org/stamp/stamp.jsp?tp=&arnumber=1592862>>, in ACM/IEEE Conference on Supercomputing, Nov. 16, 2002, pp. 35.

Smith, et al., "Scientific Computing Beyond CPUs: FPGA Implementations of Common Scientific Kernels", Retrieved at <<http://ft.ornl.gov/pubs-archive/vetter-xfer/2005-mapld-src-eval.pdf>>, in International Conference of Eighth Annual Military and Aerospace Programmable Logic Device, Sep. 7, 2005, pp. 8.

Bell, et al., "Implementing Sparse Matrix-Vector Multiplication on Throughput-Oriented Processors", Retrieved at <<http://sbel.wisc.edu/Courses/ME964/Literature/spmvBellGarlandSC2009.pdf>>, in Proceedings of the Conference on High Performance Computing Networking, Storage and Analysis, Nov. 2009, pp. 11.

Shan, et al., "FPGA and GPU Implementation of Large-Scale SpMV", Retrieved at <<http://ieeexplore.ieee.org/stamp/stamp.jsp?tp=&arnumber=5521144>>, in IEEE 8th Symposium on Application Specific Processors, Jun. 13, 2010, pp. 7.

Zhang, et al., "FPGA vs GPU for Sparse Matrix Vector Multiply", Retrieved at <<http://ieeexplore.ieee.org/stamp/stamp.jsp?tp=&arnumber=5377620>>, in International Conference on Field-Programmable Technology, Dec. 9, 2009, pp. 8.

Kumar, et al., "FPGA Based High Performance Double-Precision Matrix Multiplication", Retrieved at <<http://ieeexplore.ieee.org/stamp/stamp.jsp?tp=&arnumber=4749697>>, in 22nd International Conference on VLSI Design, Jan. 5, 2009, pp. 6.

"Supercomputing at 1/10th the Cost", Retrieved at <<http://www.nvidia.com/content/global/global.php>>, Jul. 6, 2012, pp. 1.

Saad, Youcef., "SPARSKIT: A Basic Tool Kit for Sparse Matrix Computations—Version 2", Retrieved at <<http://citeseerx.ist.psu.edu/viewdoc/download;jsessionid=DE18086FB7E931AC7C0CAD93D7354113?doi=10.1.1.41.3853&rep=rep1&type=pdf>>, in Technical Report of Computer Science Department, University of Minnesota, Jun. 6, 1994, pp. 36.

Nagar, et al., "A Sparse Matrix Personality for the Convey HC-1", Retrieved at <<http://ieeexplore.ieee.org/stamp/stamp.jsp?tp=&arnumber=5771239>>, in IEEE 19th Annual International Symposium on Field-Programmable Custom Computing Machines, May 1, 2011, pp. 8.

Kestur, et al., "BLAS Comparison on FPGA, CPU and GPU", Retrieved at <<http://www.cse.psu.edu/~kesturvy/kestur_isvlsi2010.pdf>>, in Proceedings of the IEEE Annual Symposium on VLSI, Jul. 2010, pp. 6.

"BEE4-SOC", Retrieved at <<http://www.beecube.com>>, Jul. 5, 2012, pp. 5.

Thacker, Chuck., "A DDR2 Controller for BEE3", Retrieved at <<http://attila.ac.upc.edu/wiki/images/5/55/MC_DDR2_Microsoft.pdf>>, in Microsoft Research Technical Report, Nov. 25, 2008, pp. 19.

Delorimier, et al., "Floating-Point Sparse Matrix-Vector Multiply for FPGAs", Retrieved at <<http://citeseerx.ist.psu.edu/viewdoc/download?doi=10.1.1.101.6483&rep=rep1&type=pdf>>, in Proceedings of the ACM/SIGDA 13th International Symposium on Field-Programmable Gate Arrays, Feb. 20, 2005, pp. 11.

Zhuo, et al., "Sparse Matrix-Vector Multiplication on FPGAs", Retrieved at <<http://www-scf.usc.edu/~lzhuo/research/lzhuo-fpga2005.pdf>>, in Proceedings of the 2005 ACM/SIGDA 13th International Symposium on Field-Programmable Gate Arrays, Feb. 20, 2005, pp. 12.

Sun, et al., "Mapping Sparse Matrix-Vector Multiplication on FPGAs", Retrieved at <<http://rssi.ncsa.illinois.edu/2007/proceedings/papers/rssi07_12_paper.pdf>>, //rssi.ncsa.illinois.edu/2007/proceedings/papers/rssi07_12_paper.pdf, Jul. 17, 2007, pp. 10.

Zhuo, et al., "High- Performance Reduction Circuits Using Deeply Pipelined Operators on FPGAs", Retrieved at <<http://halcyon.usc.edu/~pk/prasannawebsite/papers/lingzhuo_fpgatran07.pdf>>, in IEEE Transactions on Parallel and Distributed System, vol. 18, Issue 10, Oct. 2007, pp. 16.

Gerards, Marco., "Streaming Reduction Circuit for Sparse Matrix Vector Multiplication in FPGAs", Retrieved at <<http://eprints.eemcs.utwente.nl/17042/01/GerardsMScThesis.pdf>>, in Master Thesis, University of Twente, Aug. 15, 2008, pp. 65.

Bakos, et al., "Exploiting Matrix Symmetry to Improve FPGA-Accelerated Conjugate Gradient", Retrieved at <<http://ieeexplore.ieee.org/stamp/stamp.jsp?tp=&arnumber=5290924>>, in 17th IEEE Symposium on Field Programmable Custom Computing Machines, Apr. 5, 2009, pp. 4.

Veen, Marcel Van Der., "Sparse Matrix Vector Multiplication on a Field Programmable Gate Array", Retrieved at <<http://essay.utwente.nl/781/1/scriptie_van_der_Veen.pdf>>, in Master Thesis, University of Twente, Sep. 2007, pp. 86.

Gregg, et al., "FPGA Based Sparse Matrix Vector Multiplication Using Commodity DRAM Memory", Retrieved at <<http://ieeexplore.ieee.org/stamp/stamp.jsp?tp=&arnumber=4380769>>, in International Conference on Field Programmable Logic and Applications, Aug. 27, 2007, pp. 6.

Kuzmanov, et al., "Reconfigurable Sparse/Dense Matrix-Vector Multiplier", Retrieved at <<http://ieeexplore.ieee.org/stamp/stamp.jsp?tp=&arnumber=5377625>>, in International Conference on Field-Programmable Technology, Dec. 9, 2009, pp. 6.

Sun, et al., "Sparse Matrix-Vector Multiplication Based on Network-on-Chip in FPGA", Retrieved at <<http://ieeexplore.ieee.org/stamp/stamp.jsp?tp=&arnumber=5578318>>, in IEEE 10th International Conference on Computer and Information Technology, Jun. 29, 2010, pp. 5.

Sun, et al., "An I/O Bandwidth-Sensitive Sparse Matrix-Vector Multiplication Engine on FPGAs", Retrieved at <<http://ieeexplore.ieee.org/stamp/stamp.jsp?tp=&arnumber=5982109>>, in IEEE Transactions on Circuits and Systems, vol. 59, Issue 1, Jan. 2012, pp. 11.

Jheng, et al., "FPGA Acceleration of Sparse Matrix-Vector Multiplication Based on Network-on-Chip", Retrieved at <<http://www.eurasip.org/Proceedings/Eusipco/Eusipco2011/papers/1569415997.pdf>>, //www.eurasip.org/Proceedings/Eusipco/Eusipco2011/papers/1569415997.pdf, Aug. 29, 2011, pp. 5.

Buluc, et al., "Parallel Sparse Matrix-Vector and Matrix Transpose-Vector Multiplication Using Compressed Sparse Blocks", Retrieved at <<http://citeseerx.ist.psu.edu/viewdoc/download?doi=10.1.1.211.5256&rep=rep1&type=pdf>>, in Proceedings of the Twenty-First Annual Symposium on Parallelism in Algorithms and Architectures, Aug. 11, 2009, pp. 12.

Buluc, et al., "Reduced-Bandwidth Multithreaded Algorithms for Sparse Matrix-Vector Multiplication", Retrieved at <<http://gauss.cs.ucsb.edu/~aydin/ipdps2011.pdf>>, in Proceedings of the IEEE International Parallel & Distributed Processing Symposium, May 16, 2011, pp. 13.

Vuduc, et al., "Fast Sparse Matrix-Vector Multiplication by Exploiting Variable Block Structure", Lawrence Livermore National Laboratory, Jul. 8, 2005, pp. 32.

Koza, et al., "Compressed Multiple-Row Storage Format", Retrieved at <<http://arxiv.org/pdf/1203.2946.pdf>>, Mar. 13, 2012, pp. 17.

Chungz, et al., "An FPGA Drop-In Replacement for Universal Matrix-Vector Multiplication", Retrieved at <<http://www.ece.cmu.edu/~calcm/carl/lib/exe/fetch.php?media=carl2012-chung.pdf>>, The Second Workshop on the Intersections of Computer Architecture and Reconfigurable Logic, Jun. 10, 2012, pp. 6.

* cited by examiner

UNIVERSAL FPGA/ASIC MATRIX-VECTOR MULTIPLICATION ARCHITECTURE

BACKGROUND

A matrix is a rectangular array of numbers, symbols, or expressions that are arranged in rows and columns, and individual items in a matrix are commonly referred to as elements or entries. Matrices are often used to represent linear transformations, that is, generalizations of linear functions such as f(x)=ax. As such, matrices can be used to project three-dimensional (3D) images onto a two-dimensional (2D) screen, to perform calculations used to create realistic-seeming motion, and so on and so forth. A sparse matrix is a matrix populated primarily with zeros, whereas a dense matrix is a matrix where a significant number of elements (e.g. a majority) are not zeros. Sparse matrices are useful in various application areas such as, for example, network theory where it is common to have a low density of significant data or connections represented by non-zero values interspersed throughout a far greater number of zero values.

Over the past forty years, the sizes of sparse matrices has grown exponentially by nearly four orders of magnitude, a rate that far outpaces the growth in DRAM associated with commodity central processing units (CPUs) and graphical processing units (GPUs), creating substantial challenges for storing, communicating, and processing. In response to this uneven growth, several compressed formats for representing sparse matrices have been proposed over the years and several are commonly used today. However, these formats tend to be CPU-centric and operate on word (e.g., 32-bit) boundaries. Moreover, different structured and unstructured matrices may be expressed in different formats, thus requiring additional CPU (i.e., processing) resources for translation between these different sparse matrix formats.

Meanwhile, the increased capacity and improved performance of field-programmable gate arrays (FPGAs) has opened the door towards customizable, reconfigurable processing capabilities for mission-critical applications in high-performance computing (HPC). Characterized by flexibility and performance, FPGAs provide a potent option for hardware approaches that can be implemented and operated as flexible software libraries. To facilitate adoption and maximize performance gains, a properly designed FPGA library for HPC would ideally provide high performance, support arbitrarily large data sets, and use minimal or no reconfiguration for different problem parameters or input formats. In addition, application-specific integrated circuits (ASICs) also provide solutions for larger quantity implementations where FPGAs might be utilized in smaller quantity utilizations.

SUMMARY

Various implementations disclosed herein are directed to a universal single-bitstream library for accelerating matrix-vector multiplication using field-programmable gate arrays (FPGAs) to process multiple matrix encodings including dense and multiple sparse formats. Such implementations may feature a hardware-optimized sparse matrix representation referred to herein as the Compressed Variable-Length Bit Vector (CVBV) format to take advantage of the capabilities of FPGAs and reduce storage and bandwidth requirements across the matrices compared to that typically achieved when using the Compressed Sparse Row (CSR) format in typical CPU- and GPU-based approaches. For dense matrices, certain such implementations may scale to large data sets with over one billion elements in order to achieve robust performance independent of the matrix aspect ratio, while also using a compressed representation for sparse matrices in order to reduce the overall bandwidth and improve efficiency. Likewise, application-specific integrated circuit (ASICs) may also be utilized in the place of FPGAs where appropriate, and accordingly any implementation disclosed herein inherently includes the disclosure of alternative implementations using ASICs in the place of FPGAs. Therefore, anywhere FPGAs are mentioned is understood to also disclose the alternative use of ASICs.

Various implementations disclosed herein are also directed to a class of sparse matrix formats that are better suited for FPGA (and/or ASIC) implementations than existing formats. Several such implementations are specifically directed to a Bit Vector (BV) format, a Compress Bit Vector (CBV) format, and a Compressed Variable-Length Bit Vector (CVBV) format that are easily encoded and decoded to prevent bottlenecking for various uses such as streaming applications, processing large data sets, and so forth. For certain implementations, the CVBV format, for example, may be used as an internal representation to support efficient ASIC implementations of matrix-vector or vector-vector multiplication.

Several implementations may further include hardware solutions that incorporate a runtime-programmable decoder to perform on-the-fly decoding of various formats such as Dense, COO, CSR, DIA, and ELL (described later herein). For select implementations a universal format converter (UFC) may be used with an application-specific integrated circuit (ASIC) to process any sparse matrix input format, and the UFC may also be used to translate sparse matrix/vectors into a sequence space that can be easily converted to other formats. Likewise, certain implementations disclosed herein are also directed to a universal converter algorithm for converting the existing formats to the BV, CBV, and/or CVBV formats and vice versa.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative implementations, is better understood when read in conjunction with the appended drawings. For the purpose of illustrating the implementations, there is shown in the drawings example constructions of the implementations; however, the implementations are not limited to the specific methods and instrumentalities disclosed. In the drawings:

FIG. 2 illustrates the Coordinate (COO) format, FIG. 3 illustrates the Compressed Sparse Row (CSR) format, and FIG. 4 illustrates the ELLPACK (ELL) format;

DETAILED DESCRIPTION

Basic Linear Algebra Subprograms (BLAS) provide a de facto application programming interface (API) standards for publishing libraries to perform basic linear algebra. The popularity of BLAS-based tuned software libraries such as MKL BLAS (a computing math library of optimized and extensively-threaded high-performance math routines for core math functions), cuBLAS (a GPU-accelerated version of the complete standard BLAS library that delivers faster performance than MKL BLAS), and cuSPARSE (which provides a collection of basic linear algebra subroutines used for sparse matrices at greater efficiency than MKL BLAS and cuBLAS) has elevated the importance of CPUs and GPUs to high performance computing (HPC). However, different libraries and input data formats are used to solve dense and sparse matrix problems. Past sparse matrix-vector multiplication solutions have relied on optimizations aimed to minimize the irregularity of the sparse matrix structure by selecting a format best suited for the matrix kernel. However, these optimizations are not necessary for dense matrix-vector computations (even though the underlying computation may be the same in both cases). Indeed, as will be appreciated by skilled artisans, the level of clustering on non-zero values directly impacts performance by increasing or decreasing the number of random vector accesses used. Consequently, it is widely believed that a single format and a single software/hardware library cannot be used effectively for both dense and sparse problems.

In general, existing optimizations of sparse formats and algorithms for CPUs and GPGPUs aim to minimize the irregularity of the matrix structure by selecting a format best suited for the matrix kernel. In contrast to the uncompressed and unencoded "Dense" matrix format, the well-known sparse matrix formats—including COO, CSR, DIA, and ELL (discussed below)—are supported by standard sparse matrix packages like SPARSKIT. However, unlike these existing formats, the CBVB format disclosed herein can be constructed at runtime to reduce the bandwidth requirements between a host processor and the FPGA. In general, the in-memory storage requirements of the CBVB format are less than other formats, thereby allowing larger problem sizes given a fixed amount of DRAM. Furthermore, many sparse formats can be readily converted into the CBVB format at runtime (thereby obviating the need for any pre-conversion).

Figure 1:
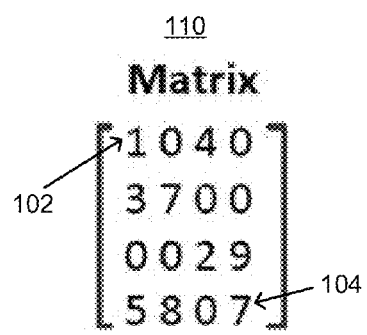
FIG. 1 is a sample matrix representative of matrices that may be utilized by various implementations disclosed herein.

FIG. 1 illustrates a sample matrix 110 representative of matrices that may be utilized by various implementations disclosed herein. As illustrated, the sample matrix 110 comprises sixteen data elements (or entries) such as the first element "1" 102 and the sixteenth/last element "7" 104 as the elements are read by row and then by column, from left to right (column-wise) and then from top to bottom (row-wise).

Figure 2:
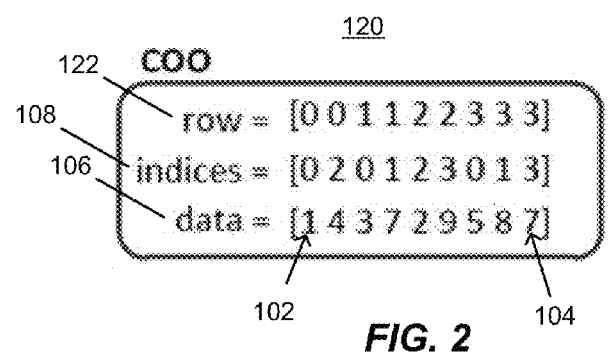
FIGS. 2-4 illustrate typical sparse matrix formats, more specifically.
Figure 3:
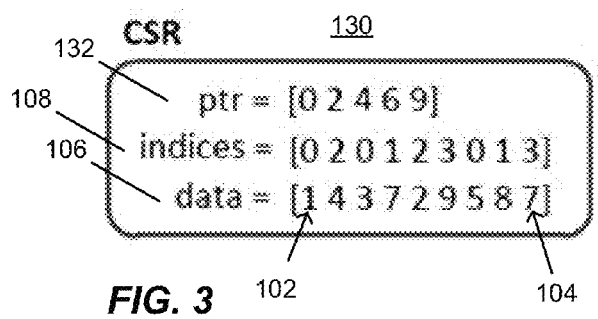
Figure 4:
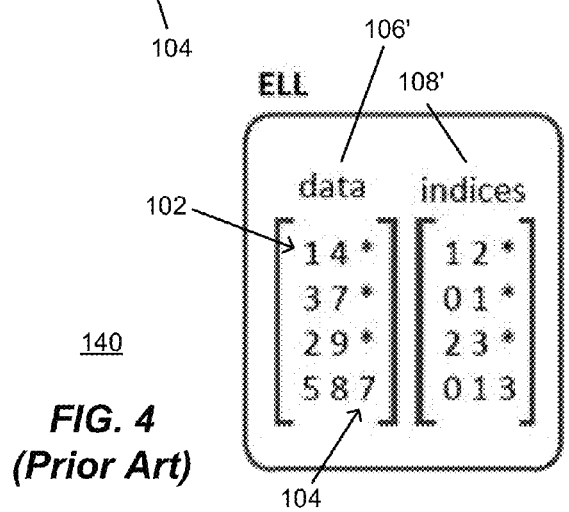

FIGS. 2-4 illustrate typical sparse matrix formats, more specifically, FIG. 2 illustrates the Coordinate (COO) format 120, FIG. 3 illustrates the Compressed Sparse Row (CSR) format 130, and FIG. 4 illustrates the ELLPACK (ELL) format 140.

COO employs three linear arrays to store information about the matrix: data, indices, and row. The data array stores nonzero values, while the indices array stores the column index for each nonzero value and the row array stores the row value for each nonzero array. CSR is very similar to COO except that CSR explicitly stores the sparse data and associated column index values—that is, rather than storing rows per value, CSR only stores pointers to the next row in the pointer ("ptr") array. This encodes variable length rows in the matrix and reduces the overall storage requirements. However, while the reduced storage requirements of CSR enables larger problem sizes in memory, the possibility of variable-length rows complicates the decoding when assigning work to processing units on a row-by-row basis.

As shown in FIGS. 2 and 3, the matrix 110 data is represented by COO 120 and CSR 130 using an array of non-zero data 106 and column indices 108 indicating the corresponding column (enumerated 0-3 from top to bottom) of the matrix 110 for each corresponding non-zero data 106 element. In addition, COO 120 of FIG. 2 also uses a row indicator 122 indicating the corresponding row (enumerated 0-3 from left to right) of the matrix 110 for each corresponding non-zero data 106 element such that the row indicator 122 and the column indicator 108 together provide a coordinate (by row and column) for each element among the non-zero data 106 elements. In contrast, CSR 130 instead uses a "ptr" row pointer 132 to indicate, corresponding to the values in the column indices 108, where each consecutive row begins.

In contrast to COO and CSR, the Diagonal (DIA) sparse matrix format is a well-known format that exploits the fact that a row pointer is not explicitly required for a fixed length representation. More specifically, DIA is specially optimized for sparse matrices composed of non-zero elements along diagonals. In this format, the diagonals are laid out as columns in a dense matrix structure (data), starting with the farthest sub-diagonal and ending with the largest super-diagonal. An additional vector (diag) is kept which maintains the offset of the diagonal represented by column "I" in "data" from the central diagonal. Since the structure of the matrix is known, this storage format does not require column offset or row pointer vectors like CSR, leading to a lower storage overhead.

The ELLPACK (ELL) format is a generalized form of DIA but where the ELL data array is an M-by-K dense array and where the number of columns is determined by the row with the most nonzero entries (K) from the original M-by-N sparse matrix. A second indices array then stores the column index values associated with each nonzero value, and all rows are padded to length K. While this padding is a source of additional storage overhead that does not exist in the CSR format, the ELL format does not require M row pointers ("ptr") that would be required by CSR and is also easy to decode. Nevertheless, the amount of padding can vary dramatically depending on the distribution of the number of nonzero values across the rows such that if the distribution is uniform ELL can occupy less storage than CSR; however, if the distribution is skewed the storage requirements for ELL can be much larger than CSR.

As such, the ELL format 140 shown in FIG. 4 takes a slightly different approach from COO and CSR in that the data array 106' is an M-by-K dense array where the number of columns is determined by the row with the most nonzero entries (K) from the original M-by-N sparse matrix 110. The indices array 108' then stores the column index values associated with each nonzero value and all rows are padded (shown as "*") to length K (here equal to 3 corresponding to the number of non-zero elements found in the fourth row of the matrix 110).

The COO, CSR, DIA, and ELL formats are all highly processor-centric (i.e., employ word-level 32-bit encodings) and do not leverage the fine-grained, bit-level manipulation capabilities of the FPGA. In contrast, the various implementations disclosed herein pertaining to improved formats comprise a series of highly compact sparse matrix storage representations (as a family of formats referred to herein as the "*BV formats") that are optimized for use with FPGAs. Like the existing COO, CSR, DIA, and ELL formats, these representations also incur low overheads in encoding and decoding. However, unlike the exiting formats, these representations are stored in a contiguous array and not constrained by word-level alignment requirements, but instead using data representations that may be smaller or larger than the standard word (32-bit) data representation of a CPU, thereby making them well suited for manipulation by FPGAs. Accordingly, several implementations disclosed herein are directed to a family of FPGA-centric formats (the "*BV formats") such as those illustrated in FIGS. 5-7.

Figure 5:
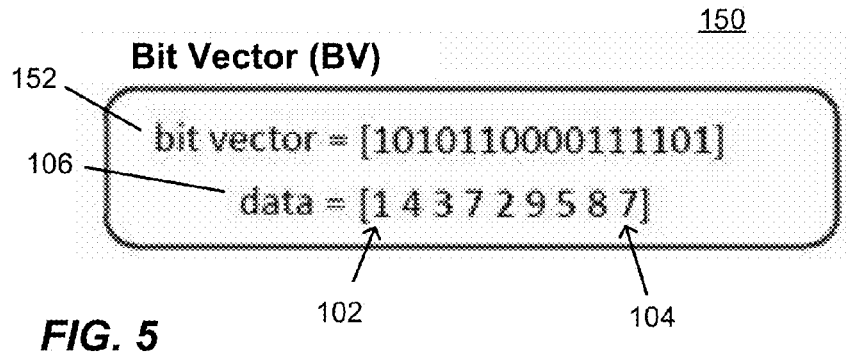
FIG. 5 illustrates the Bit-Vector (BV) format representative of various implementations disclosed herein.

FIG. 5 illustrates the Bit-Vector (BV) format 150 representative of various implementations disclosed herein. In BV 150, contiguous sequences of zeros and non-zeros are encoded using a fixed-width encoding. For BV, this encoding comprises one bit per element, although multi-bit implementations are also possible in other mappings where each element location in the matrix indicates whether a zero value or non-zero value is present. In other words, as shown in FIG. 5, the positions for the data 106 is represented by a bit vector array 152 having as many bits as the number of elements in the matrix 110 where a "1" indicates the position (in order) of each non-zero element in the matrix 110 stored as data 106, while "0" indicates a zero value. Thus, in effect, the bit vector array 152 is a binary representation of the entire matrix 110 indicating the locations of the non-zero values in the matrix 110 that are stored as data 106.

In operation, the BV approach for representing a matrix comprises populating a data array with the plurality of non-zero elements and then populating a vector array with information corresponding to the location of each value from among the plurality of non-zero elements. Before populating either array, it may be useful to determine location coordinates for the non-zero elements in the matrix from matrix metadata that is part of a matrix data stream in a processor-centric (i.e., non-FPGA-centric or conventional) sparse format.

Figure 6:
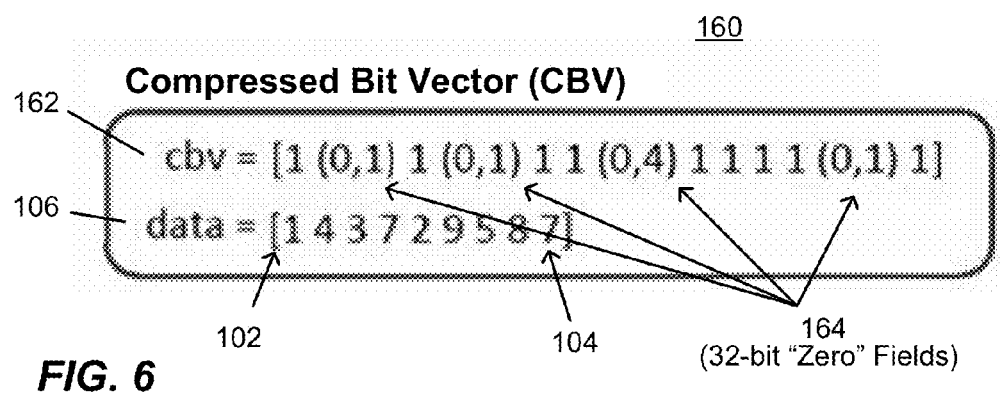
FIG. 6 illustrates the Compressed Bit-Vector (CBV) format representative of various implementations disclosed herein.

FIG. 6 illustrates the Compressed Bit-Vector (CBV) format 160 representative of various implementations disclosed herein. While there may be several approaches to compressing the bit vector array 152 of BV 150, the CBV format 160 comprises the specific compression approach herein described. In summary, CBV is an optimization of BV where a single bit is used to encode either a '0' (zero) or '1' (non-zero) followed by a 31-bit field that encodes the number of contiguous zeros or non-zeros. The 31-bit field is large enough to store the largest number of contiguous values (i.e., the maximum column length). As shown in FIG. 6, CBV 160 comprises an array of non-zero data 106 and a compressed "cbv" array 162 that is similar to the bit vector array 152 except that the number of zero values in the compressed array 162 is represented using a 32-bit "zero" field comprising the 1-bit zero value followed by a 31-bit field encoding the number of consecutive zeros (comprising the sequence of zeros following the previous non-zero value).

Figure 7:
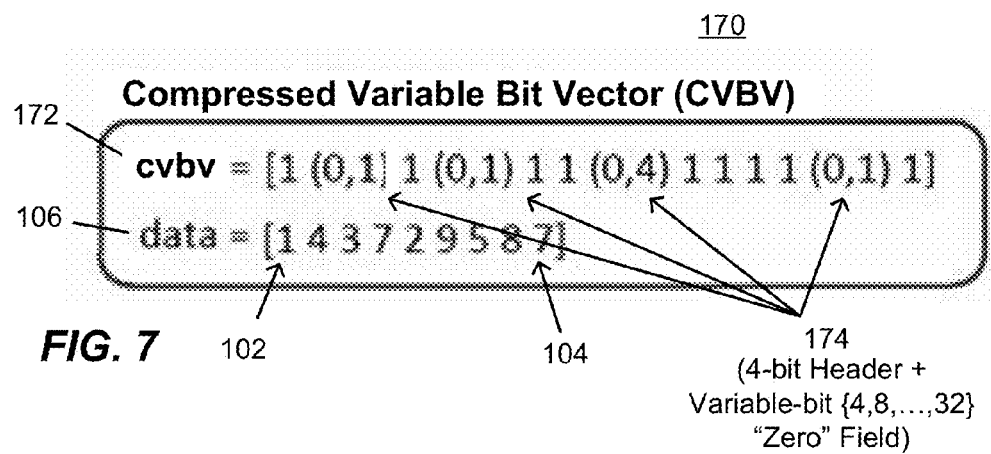
FIG. 7 illustrates the Compressed Variable-Length Bit-Vector (CVBV) format representative of various implementations disclosed herein.

FIG. 7 illustrates the Compressed Variable-Length Bit-Vector (CVBV) format 170 representative of various implementations disclosed herein. While there may be several approaches to enable variable lengths of the bit vector array of CBV 160, the CVBV format 170 comprises the specific variable-length approach herein described. CVBV improves upon the CBV format by featuring run-length encoding stored using a variable-length data field and thereby offering increased storage savings if cluster sizes tend to be small. In the CVBV scheme, a 4-bit header is attached to the beginning of a cluster of zeros or non-zeros where the first bit indicates a zero (0) or non-zero (1) while the next three bits indicate how many bytes (or other granularity, e.g., a nibble of 4-bits) are used to store the count (up to 8 bytes or units). The subsequent variable length field then encodes the consecutive number of zeros or non-zeros. Thus, as shown in FIG. 7, the CVBV 170 structure is similar to the CBV structure except that the variable-bit compressed "cvbv" array 172 is represented using a variable-bit "zero" field 174 comprising a 1-bit zero value (shown as "0" in the first position of the parenthetical, i.e., "(0,4)" followed by a 3-bit size (in bytes) and the number of consecutive zeros (comprising the sequence of zeros following the previous non-zero value) encoded within the size indicated. 4-bit header used herein is merely an exemplary instance of the format, and as such the size of the header (and hence the number of variable-length combinations) is entirely flexible and various alternative implementations may utilize more or less than four bits accordingly.

In many real-world matrices the zero and nonzero elements tend to cluster but the cluster sizes are typically encodable with a 31-bit data field. Furthermore, nonzero cluster size is relatively small compared to zero cluster size, and thus it is possible to encode the zero values using run-length encoding while the nonzero values are encoded as single bits. Consequently, variable-length encoding using CVBV dramatically reduces storage overheads compared to CSR but very rarely exceeds the storage requirements of CSR. Moreover, matrices with large column dimensions but a low percentage of non-zeros typically use more bits to encode long sequences of zeros.

It should be noted that one possible inefficiency of the CVBV format (and the other "*BV formats" as well) is that, in order to process an entire sparse matrix, the CVBV metadata must be scanned in from memory and decoded sequentially which, in turn, limits the amount of parallelism that can be exposed during computation largely because the sequential decoder limits the rate at which work can be processed. However, to mitigate this shortcoming, the CVBV stream can be logically partitioned into independent CVBV chunks where each chunk is a self-contained CVBV stream that only represents a subset of the sparse matrix. These CVBV chunks are stored sequentially and adjacently in main memory, and each CVBV chunk is associated with a CVBV header which encodes the following: (1) the size of each particular CVBV chunk, (2) an offset index into memory to where the particular CVBV chunk resides, and (3) the number of non-zeros and rows represented by that particular CVBV chunk. The CVBV headers may be stored in another contiguous region of memory, and may be scanned in from memory ahead of time before the CVBV chunks. Each CVBV header provides enough information to read in multiple CVBV chunks without sequential dependence, thereby enabling parallel execution. Accordingly, the overhead resulting from the CVBV headers may be minimized by utilizing sufficiently large CVBV chunk sizes; for example, a chunk size of 1024 non-zeros would be sufficient to keep the overhead to a very small and efficient size. Thus, for the "*BV formats" including the CVBV format herein disclosed, chunking reduces the risk of occurrence of a sequential processing bottleneck that might otherwise occur.

In addition to these FPGA-centric formats, various implementations disclosed herein are also directed to the use of a matrix-vector or vector-vector multiplication engine (MVME) that provides a common computation hardware accelerator for both sparse and dense matrix-vector or vector-vector multiplication by modifying the memory subsystem to efficiently compute both dense and sparse forms of such problems. For the sparse case, such implementations may add row and column pointers in order to efficiently coalesce and overlap memory accesses. Regarding these various implementations, the MVME hardware accelerator may be runtime configurable for dense or sparse inputs by utilizing a floating-point computation kernel that is insensitive to matrix dimensions (and thus immune to short vector effects). The MVME may further comprise a Bit Vector Cache (BVC) to generate the aforementioned row pointers. By run-length encoding zero sequences, the MVME can rapidly count the number of nonzero values per row, and then the row pointers are placed into a first-in-first-out (FIFO) queue that also features additional load-balancing by permitting task stealing (a.k.a., row stealing) whereby any computation kernel can grab the next row off of the row pointer FIFO queue. The MVME may also feature a column address FIFO queue to store the column index for the vector in order to grant access to a Vector Cache (VC). In operation, the MVME may read in blocks of the matrix and reuse the vector to optimize data reuse and improve memory bandwidth efficiency.

In addition, various implementations are also directed to a universal hardware approach that incorporates support for sparse matrices. These implementations, upon receiving from a universal sparse format converter a compressed CBV matrix format, (1) generate and distribute the matrix rows across multiple pipelines, (2) stream in the sequential non-zero data, and (3) enable random accesses of the input 'x' vector. Such implementations may further rely on a work stealing queue and a decentralized control unit that enables decoupled random accesses to the input/output vectors to support efficient sparse matrix-vector multiplication.

Because of the variability in the size and distribution of nonzero values per row, a mechanism is needed to supply memory pointers for streaming different rows into the on-chip matrix memory. By scanning and counting the nonzero values in a row, the starting row offsets could be buffered into a work stealing queue which is then, in turn, consumed efficiently by multiple pipelines. To support random accesses to the vector x—and in view of memory port limitations and irregular access characteristics—another column-based FIFO queue is used to coalesce the column addresses for the corresponding entries in the matrix memory.

The resulting compressed bit vector provides a compact and efficient representation that easily allows a counter to produce the address of the next column pointer that is stored in a FIFO. Moreover, using a private vector cache for each pipeline to request vector x values (up to 4 or 8 at a time, for example, although other values are possible) as needed to compute a dot-product enables the system to capture the spatial locality of nonzero values observed in many of the sparse matrices. Additional optimizations could also be applied to this system include but are not limited to non-blocking, shared cache, and so forth.

In addition, various implementations described herein pertain to a universal, single-bitstream library for accelerating double-precision matrix algebra. Over the past four decades, sparse matrix sizes have grown exponentially. To compensate, CPUs have relied on the greater and greater memory capacity made available by large modern servers. Unfortunately, the same has not true for general-purpose GPUs (GPGPUs) which have had to instead rely on blocking to sidestep the lack of large DRAM capacity. In contrast, several commercially-available FPGA systems have access to large memory capacities comparable to servers targeting the same application space. Accordingly, FPGAs can generally offer more robust sustained performance across input types, whereas GPUs are more likely to experience substantial variations in performance depending on the input type.

Consequently, such implementations feature a universal library in the form of an FPGA-based matrix-vector multiplication (MVM) kernel. To be universal, this library feature the capability of processing a multitude of matrix formats including both dense and multiple-format sparse encodings. For dense MVM (DMVM), efficient memory blocking and low overhead floating-point units are utilized to sustain constant performance even in the presence of short vectors. For sparse MVM (SMVM), high hardware utilization is maintained even in the presence of irregular memory access patterns. These implementations further feature (1) the use of only a single bitstream to handle both dense and sparse formats, (2) support for arbitrary matrix sizes up to the memory capacity of the system, and (3) being agnostic to the matrix aspect ratio. In addition, a hardware-optimized format is used that minimizes the storage overhead used to encode matrices of any type. Compared to the traditional Coordinate (COO) or Compressed Sparse Row (CSR) formats, this Compressed Variable-Length Bit Vector (CVBV) approach substantially reduces the storage and memory bandwidth needed to handle sparse matrices.

An exemplary universal MVM library may be implemented as a single bitstream that can be treated as a "library" while being agnostic to matrix formats. The library further incorporates a flexible decoder that specifies the characteristics of a dense or sparse matrix format at runtime—a dimension of flexibility missing from other libraries or previous FPGA-based MVM kernels restricted to single formats. This library also uses a hardware-optimized sparse format which exploits the bit-manipulation capabilities of the FPGA. Together these elements form the core of the exemplary universal sparse format decoder representative of several implementations disclosed herein.

It should also be noted that the use of floating point only applies to the pipelined nature of the computation units and the ability to tolerate any aspect ratio because of the delay through the computation units. It is also possible to have as inputs single- and double-precision floating point and even integer matrices while still enjoying storage savings.

Figure 8:
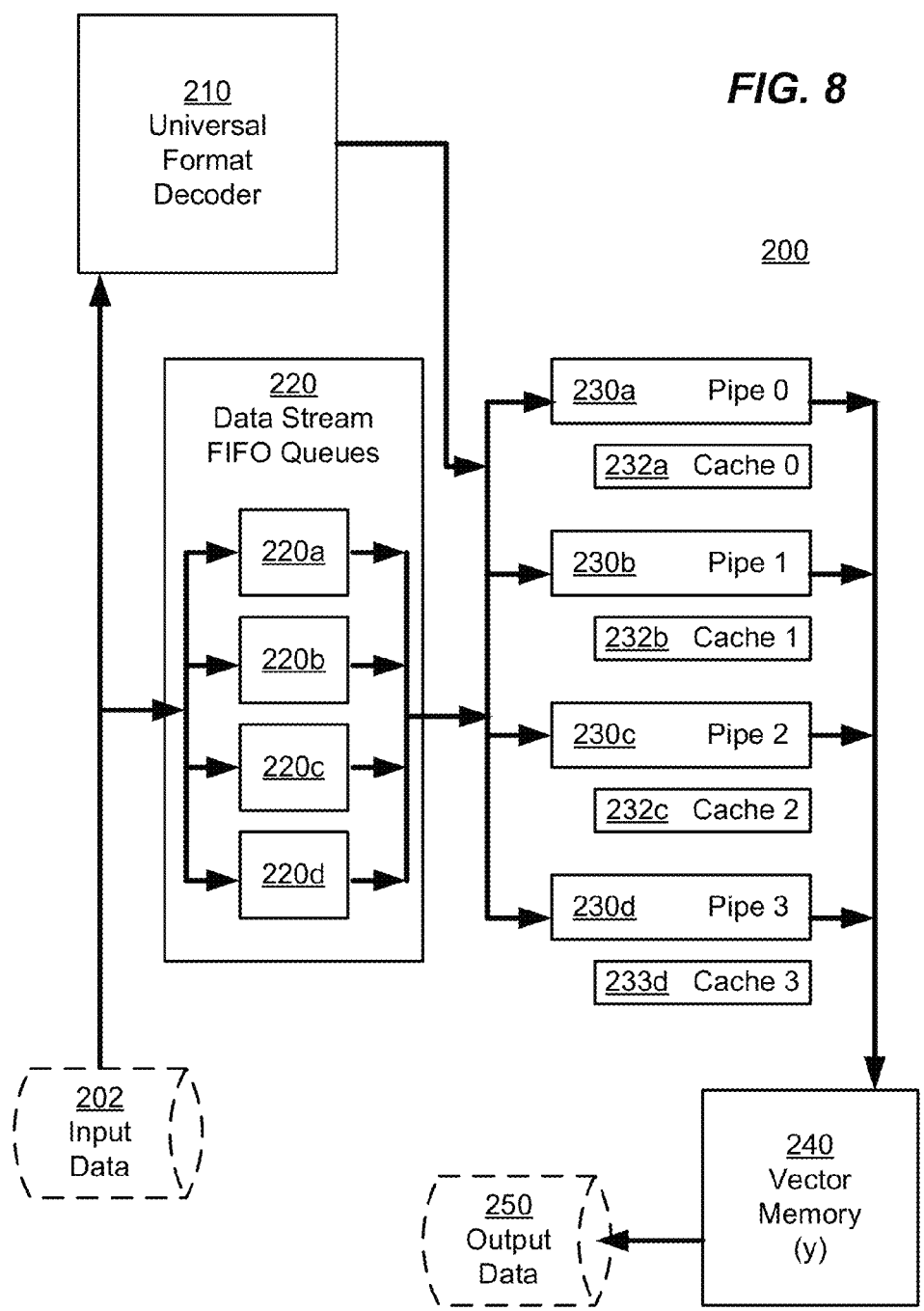
FIG. 8 is a block diagram illustrating an FPGA-based matrix-vector multiplication (MVM) kernel representative of several implementations disclosed herein.

FIG. 8 is a block diagram illustrating an FPGA-based matrix-vector multiplication (MVM) kernel 200 representative of several implementations disclosed herein. As shown in FIG. 8, the MVM 200 comprises a universal format decoder 210 and data stream FIFO queues 220 (including individual queues 220a, 220b, 220c, and 220d) that receives a data bitstream from an input data source 202. The decoder 210 and the queues 220 then pass data to the plurality of pipes 230 with private caches 232 (comprising pipes 230a, 230b, 230c, and 230d, each having a private cache 232a, 232b, 232c, and 232d respectively) for processing. The processed data is then passed to the vector memory 240 and is passed in turn as output data 250. As such, this FPGA-based matrix-vector multiplication (MVM) kernel utilizes (a) a universal decoder for converting a non-FPGA-centric (i.e., processor-centric) matrix data formats into an FPGA-centric matrix data format; (b) a data stream queue first-in-first-out (FIFO) for managing a plurality of data streams for processing; (c) a plurality of processing pipes for processing data streams from among the plurality of data streams; and (d) a vector memory for multiplexing the processed plurality of data streams into output data.

While many sparse matrix packages provide the ability to transform one sparse format into another, they generally use an intermediate representation to do so. However, one feature of the various MVM implementations disclosed herein is the ability to process matrices in multiple sparse formats without an explicit conversion step. More specifically, the present approach incorporates a runtime programmable decoder placed between the memory-to-computation datapath to support the use of special format descriptors that enable us to programmatically convert the meta-data encoded in another sparse matrix format (e.g., COO, CSR, DIA, and ELL) into BV, CBV, or CVBV.

Figure 9:
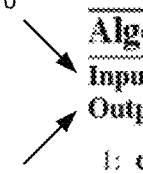
FIG. 9 is a pseudocode algorithm for a runtime programmable decoder representative of several implementations disclosed herein.

FIG. 9 is a pseudocode algorithm 300 for a runtime programmable decoder representative of several implementations disclosed herein. The algorithm 300 ("Algorithm 1") describes the high-level procedure of the decoder. The basis for this algorithm is the realization that any of the sparse formats described herein can be characterized by a few runtime parameters (or metadata): (1) number of rows R and columns C of matrix A, (2) number of nonzero values, and (3) number of streams of data in memory (up to three). Within the algorithm, each of the streams 320 are represented as FIFO objects that contiguously store data and metadata about a given sparse matrix. By convention, stream[0] refers to the data stream, stream[1] refers to the column stream, and stream[2] (if used by a given sparse format) refers to the row stream. Each stream is associated with a collection of bit fields populated at runtime to form metadata descriptors. These metadata descriptors describe the meaning of the stream values and how to translate each nonzero of matrix A into matrix coordinates which, in turn, can then be used to encode the CBV or CVBV. In other words, by determining the meaning of the stream values, the metadata descriptors enable the engine to translate each nonzero element of the matrix into matrix coordinates to be used to encode an FPGA-centric stream.

The descriptors define parameters such as: (1) type of stream data (e.g., a nonzero value versus metadata), (2) fixed-length streams (e.g., ELL, DIA, etc.) vs. variable-length (e.g., COO, CSR, etc.), (3) pointer to the given stream in memory, and (4) whether each element of the stream is a pointer into another array (e.g., row array in CSR) or a direct index into the matrix (e.g., column array in CSR).

For convenience, the algorithm 300 of FIG. 9 is replicated here:

---
Algorithm 1: Universal Matrix Format Decoder
---
Input: queue streams[3]
Output: Compressed data and sequence numbers
 1: data = streams[0].head
 2: cx = streams[1].head
 3: rx = streams[2].head
 4: rowStream = FixedLenRows? stream[0] : stream[2]
 5: for i = 0 to NNZ − 1 do //NNZ = number of non-zero values
 6:     r = RowAddress? rx : ((rowStream. idx−1)/K)
 7:     c = cx + ((pivot == −1) ? r : pivot)
 8:     seq = r * COLS + c //converts to CVBV
 9:     stream[0]:dequeue( )
10:     if stream[1]then
11:         stream[1]:dequeue( )
12:     end if
13:     if RowAddress then ---
Algorithm 1: Universal Matrix Format Decoder
---
14:         stream[2]:dequeue( )
15:     else if (rx streams[1]:idx) > 1 then
16:         stream[2]:dequeue( )
17:     end if
18: end for In operation, this algorithm (which, again, is for a runtime programmable decoder of a matrix data stream comprising metadata) determines the following about the matrix form the matrix metadata: (a) the number of rows and the number of columns comprising the matrix; (b) the number of non-zero elements comprising the matrix; and (c) the number of streams of data in a memory corresponding to the matrix. From this information, coordinates for each non-zero element in the matrix can be determined and, accordingly, the matrix data stream can be "recoded" into one of the FPGA-centric formats described herein.

For simplicity, the present procedure represented by Algorithm 1 only considers row-major representations, although column-major duals also exist and adapting Algorithm 1 to such formats is readily within the abilities of skilled artisans. In the case of fixed-length representations (e.g., ELL), specify a K parameter corresponding to the number of elements in the row. Furthermore, in some cases representations with fixed length rows have padded values which need to be stripped out of the FIFO stream using a pad token. Another descriptor may be a pivot value which is needed in formats such as DIA and used to translate a relative offset into a real matrix coordinate. To illustrate how Algorithm 1 operates, the parameter settings needed to support various dense and sparse formats are enumerated as follows:

(1) For All Formats: number of rows, columns, and non-zero elements, and streams[0] with other streams null unless specified otherwise.

(2) For Dense Formats: streams[0] is fixed length of number of columns.

(3) For COO Formats: streams[2:0] are variable length, and streams[2:1] provide absolute column and row addresses.

(4) For CSR Formats: same as COO except streams[2] provides row pointers. (Note that line 6 in Algorithm 1 calculates the correct row index by setting K=1.)

(5) For ELL Formats: streams[1:0] are a fixed length of K, there is a pad symbol, and streams[1] provides column addresses.

(6) For DIA Formats: same as ELL but pivot value is set to −1 and column addresses are relative to the diagonal.

Figure 10:
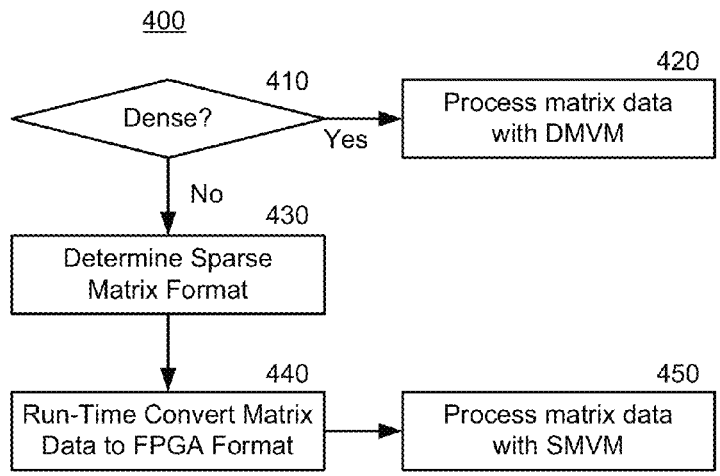
FIG. 10 is a process flow diagram representative of several implementations disclosed herein for processing a matrix data stream.

FIG. 10 is a process flow diagram 400 representative of several implementations disclosed herein for processing a matrix data stream. At 410, the format of the input data stream is determined to be either dense or sparse and, if the data stream is in a Dense format, then at 420 the stream is processed with the DMVM (i.e., without compression or encoding). On the other hand, if the data stream is in a known sparse matrix format (e.g., COO, CSR, DIA, or ELL), then at 430 the specific sparse matrix format is identified and at 440 the matrix data stream is run-time converted into one of the FPGA-based sparse-matrix formats (e.g., BV, CBV, or CVBV) if appropriate before being processed, at 450, with the SMVM that is based on the format. If the sparse matrix format is input as one of the FPGA-based format (e.g., BV, CBV, or CVBV), then no run-time conversion is used.

In view of the foregoing, the various implementations of the universal MVM library disclosed herein feature a floating point BLAS Level 1 and Level 2 kernel. Some such implementations may feature a scalable stall-free accumulator to offer robust, sustained performance independent of the matrix aspect ratio, even though such an approach could only support problems that fit within on-chip memory, thus making it less practical for real-world applications. Therefore, several such implementations instead extend the original BLAS architecture to support large data set sizes up to the memory system capacity. Furthermore, these several implementations handles both dense (DMVM) and sparse (SMVM) matrix-vector multiplication by incorporating (a) a flexible DMA engine for tiled and irregular accesses, (b) a universal decoder (described above) and (3) cache structures for handling the irregularity of memory accesses in sparse matrices.

The combination of support for large-scale DMVM, SMVM, and universal decoding offers a single-bitstream solution that can be used to support a wide variety of inputs in memory—from dense matrices of arbitrary aspect ratios to sparse matrices with varying amounts of sparsity. These various implementations effectively provide a library comparable to the MKL, or cuBLAS and cuSPARSE libraries but utilizing an approach that is not only flexible and scalable across different FPGAs and platforms but that can also be further mapped to newer systems with increased FPGA capacity and bandwidth.

Turning attention now to the dense matrix-vector multiplication implementations and the baseline datapath for supporting large-scale dense MVM, each of the pipelines contain multiple stall-free accumulators used to compute dot-products of each matrix row. Three additional components are also utilized: a controller for address generation and synchronization, programmable DMA engines, and multiple memory controllers. These added components enable the approach to scale vertically via additional pipelines or horizontally by increasing the number of accumulators per pipeline. A DMVM controller is responsible for dividing a large matrix and its input/output vectors into tiles that can fit within on-chip memory. During runtime, the controller issues requests to the direct memory access (DMA) engine which streams in the matrix and associated vectors. In hardware, the vector memories are scaled as large as possible to maximize re-use across multiple tiles. The DMA engine is responsible for contiguous and 2D strided access to memory and can be configured at runtime to support arbitrary matrix dimensions.

In order to add support for sparse matrices (and the incremental extensions needed for sparse support), a universal decoder (described earlier herein) first produces a compressed matrix format (e.g., CVBV) that (1) generates and distributes the matrix rows across multiple pipelines, (2) streams in the sequential nonzero data, and (3) supports random accesses to the input 'x' vector. The architecture also employs a work stealing queue and a decentralized control unit that enables decoupled random accesses to the input/output vectors to support efficient sparse matrix-vector multiplication. Because of the variability in the size and distribution of nonzero values per row, a mechanism to supply memory pointers for streaming different rows into the on-chip matrix memory from contiguous off-chip memory is utilized. The work stealing queue employs three FIFOs used to store the number of nonzero values per row (NzCnt), the column indices, and the row pointer. When a pipeline dequeues the work stealing queue, it also dequeues the NzCnt from the FIFO and dequeues the corresponding number of column indices and forwards them to the consuming pipeline.

To support random accesses to the vector x, and in view of memory port limitations and irregular access characteristics, the pipeline column address FIFO decouples the pipeline from the decoder to locally coalesce the column addresses for the corresponding entries in the matrix memory. This enable a private vector cache per pipeline to be used to request (up to 4 or 8, for example, although other values are possible) vector x values needed to compute a dot-product. By also using a cache, the system is able to capture the spatial locality of nonzero values observed in many of the sparse matrices.

This approach achieves comparable bandwidth utilization relative to the state-of-the-art FPGA and GPGPU systems, but does not significantly increase resource utilization over the DMVM approach because the centralized control is only modified to support a work-stealing queue. Moreover, the FIFOs of the work stealing queue increase the buffer RAM usage of this approach but do not limit the overall performance. On the other hand, because of the irregular memory accesses inherent to sparse matrices, the achieved efficiency across all platforms may be highly sensitive to clustering and row length. Regardless, further improvements to optimization and scaling are readily achievable by adding a non-blocking, multi-banked cache, scaling to larger and/or multiple FPGAs, and so on and so forth.

For MVM, many existing approaches focus on the efficient use of on-die memories to tile the data set for reducing external memory bandwidth and maximizing the performance and efficiency of the functional units. Moreover, for sparse MVM the majority of existing approaches have been optimized specifically for the commonly-used CSR format and, depending on the implementation, the metadata for CSR is either preloaded into the bitstream or dynamically accessed from external memory. While earlier approaches were restricted to on-die memory capacities, some of the more recent approaches incorporate memory hierarchies that can handle large data sets exceeding the available on-chip memories.

The various implementations disclosed herein, however, are readily distinguishable over these existing approaches because (a) the various implementations disclosed herein employs a highly efficient hardware-optimized intermediate format that significantly reduces the bandwidth and storage requirements of real-world inputs, and (2) unlike format-specific implementations, an approach employs a single bitstream to handle matrices in any arbitrary format, from row or column dense formats to arbitrary sparse formats. Consequently, disclosed implementations offer a single universal bitstream that can support matrix algebra without FPGA reconfiguration.

Disclosed herein are various implementations for a universal matrix-vector multiplication (MVM) library to accelerate matrix algebra using FPGAs. These implementations can be scaled to over a billion elements and can flexibly support a wide variety of matrix formats using a single bitstream. These implementations further incorporates a runtime reconfigurable decoder that enables the system to handle matrices of all types in memory, from dense to multiple sparse formats such as COO, CSR, DIA, and ELL, for example. Moreover, this single bitstream removes the prohibitively expensive amount of time needed to configure the FPGA for different problem classes. These implementations are also flexible and scalable with respect to resources and performance by riding the transistor scaling curve for new generations of FPGAs. (Moreover, as previously discussed, ASIC implementations of the universal MVM library in heterogeneous devices are also anticipated and disclosed.)

Figure 11:
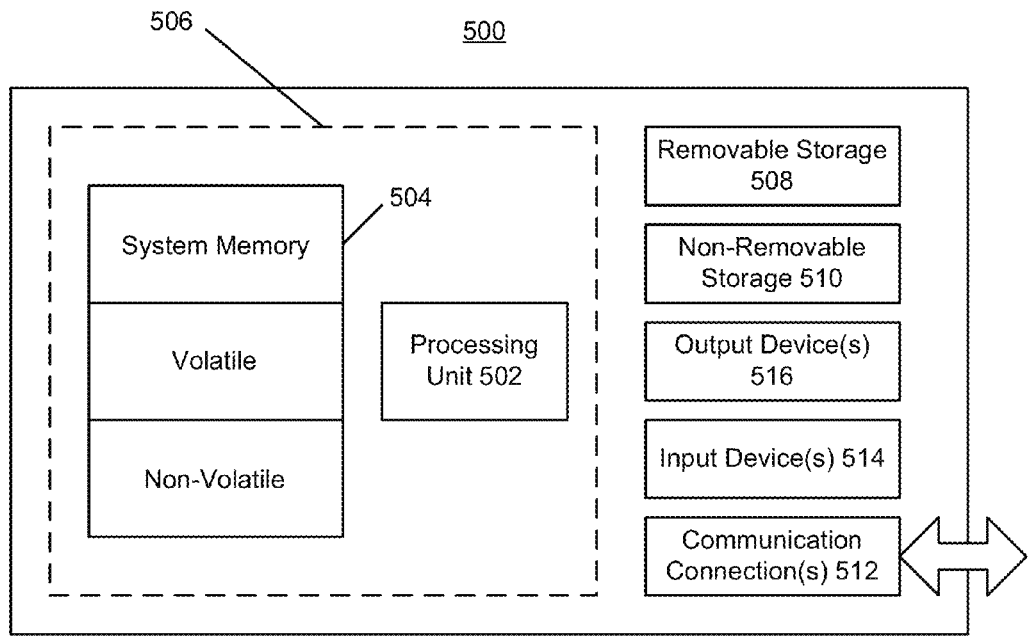
FIG. 11 is a block diagram of an example computing environment that may be used in conjunction with example implementations and aspects.

FIG. 11 is a block diagram of an example computing environment that may be used in conjunction with example implementations and aspects. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 11 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 11 by removable storage 508 and non-removable storage 510.

Computing device 500 typically includes a variety of computer readable media. Computer readable media can be any available media that can be accessed by device 500 and include both volatile and non-volatile media, as well as both removable and non-removable media.

Computer storage media include volatile and non-volatile media, as well as removable and non-removable media, implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well-known in the art and need not be discussed at length here.

Computing device 500 may be one of a plurality of computing devices 500 inter-connected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In addition, although specific values have been used to describe, in an exemplary fashion, certain implementations disclosed herein, these values are not intended to be limiting but, instead, are merely provided by way of explanation and, accordingly, other values are anticipated and hereby disclosed for each of these features.

What is claimed:

1. A matrix-vector multiplication device comprising:
a runtime programmable decoder for transforming processor-centric sparse matrix data directly into field-programmable gate array (FPGA)-centric matrix data without utilizing an intermediate representation of the matrix data by:
   determining that the processor-centric sparse matrix data is encoded in a sparse format;
   identifying which sparse format of a plurality of sparse formats that the processor-centric sparse matrix data is encoded in based on metadata associated with the matrix data; and
   transforming the processor-centric sparse matrix data directly into the FPGA-centric matrix data based on the identified sparse format;
a plurality of data stream-first-in-first-out (FIFO) queues for managing a plurality of data streams for processing;
a plurality of processing pipes for receiving the plurality of data streams from the plurality of data stream FIFO queues and processing data streams from among the plurality of data streams; and
a vector memory for multiplexing the processed plurality of data streams into output data.

2. The device of claim 1, wherein the runtime programmable decoder is further capable of processing a dense matrix.

3. The device of claim 1, wherein the plurality of sparse formats comprises one or more of a Coordinate (COO) format, a Compressed Sparse Row (CSR) format, a Diagonal (DIA) format, and an ELLPACK (ELL) format.

4. The device of claim 1, wherein the runtime programmable decoder is runtime configurable for a dense format or the plurality of sparse formats by utilizing a floating-point computation kernel that is insensitive to matrix dimensions.

5. The device of claim 1, further comprising a Bit Vector Cache (BVC) to generate row pointers.

6. A method comprising:
receiving, at a runtime programmable decoder, a matrix data stream comprising metadata corresponding to a matrix, wherein the matrix data stream is in a processor-centric format;
determining that the matrix data stream is encoded in a sparse format;
identifying which sparse format of a plurality of sparse formats that the matrix data stream is encoded in based on the metadata corresponding to the matrix;
determining a number of rows and a number of columns comprising the matrix from the metadata;
determining a number of non-zero elements comprising the matrix from the metadata;
determining a number of streams of data in a memory corresponding to the matrix from the metadata;
determining coordinates for each non-zero element from among a plurality of non-zero elements in the matrix; and
recoding the matrix data stream into a field-programmable gate array (FPGA)-centric or an application-specific integrated circuit (ASIC)-centric format based on the identified sparse format.

7. The method of claim 6, further comprising:
describing the meaning of the stream values; and
translating each nonzero element of the matrix into matrix coordinates to be used to encode an FPGA-centric or ASIC-centric stream.

8. The method of claim 6, further comprising operating on a row-major representation of a first matrix and a column-major representation of a second matrix.

9. The method of claim 6, further comprising stripping out padded values for data streams that have padded columns.

10. A method comprising:
receiving a plurality of data streams at a decoder and at a plurality of data stream queues;
determining that the plurality of data streams are encoded in a sparse format;
identifying which sparse format of a plurality of sparse formats that the plurality of data streams are encoded in based on metadata associated with the plurality of data streams;
converting the plurality of data streams into a field-programmable gate array (FPGA)-centric or an application-specific integrated circuit (ASIC)-centric format based on the identified sparse format;
processing the plurality of data streams at the decoder and at the plurality of data stream queues to generate data provided to a plurality of processing pipes;
processing the data at the plurality of processing pipes to generate processed data;
providing the processed data to a vector memory; and
multiplexing the processed plurality of data streams into output data.

11. The method of claim 10, wherein the plurality of data streams comprises data in a processor-centric matrix data format.

* * * * *